May 7, 1968     A. L. HUBBARD     3,381,457

COTTON HARVESTER

Filed Sept. 3, 1965

INVENTOR.
A.L. HUBBARD

BY *William A. Murray*

ATTORNEY

United States Patent Office 3,381,457
Patented May 7, 1968

3,381,457
COTTON HARVESTER
Arthur L. Hubbard, Des Moines, Iowa, assignor to Deere & Company, Moline, Ill., a corporation of Delaware
Filed Sept. 3, 1965, Ser. No. 484,948
10 Claims. (Cl. 56—44)

This invention relates to a cotton harvester. Still more particularly this invention relates to an improvement on a conventional type cotton harvester that is utilized to clean the harvested cotton and also to prevent loss of cotton in the harvesting and cleaning operation.

In U.S. Patent 2,904,948 which issued to Mr. A. L. Hubbard on Sept. 22, 1959, there is shown and described a housing structure formed about an upright harvesting mechanism. The harvesting mechanism includes a series of vertically spaced laterally extending spindles that move in an orbit, part of which is in a plant passage alongside the housing. The housing structure surrounding the drum has an opening adjacent the rear side of the drum that permits trash accumulated in the harvesting operation to pass outwardly of the housing. This plus other features set forth in the patent has proven to be of great benefit in the mechanical harvesting of cotton since it eliminates the accumulation of trash with the cotton that heretofore has reduced the quality of cotton harvested by machines.

Due to various characteristics of the cotton bolls, as well as various climatic conditions in harvesting, there is sometimes created a condition in which the cotton bolls are not sufficiently held by the cotton spindles during and after the harvesting operation. Under such conditions a small amount of cotton will be thrown through the rear trash opening along with the trash. Although cotton lost in this manner is not of great quantity, it is nevertheless desirable to eliminate such loss.

With the above in mind, it is therefore the object of the present invention to provide an upright grille structure across the opening that permits the cotton to impinge against it and to be retained within the housing structure. Trash accumulated with the cotton during the harvesting operation may pass through the grille.

More specifically, the grille structure is composed of a series of horizontal members or bars that extend across the opening and are disposed in horizontal alignment with the spacing between the rows of spindles on the harvesting drum. In the preferred form, the horizontal bars or members will be vertically aligned with the outer tips of the spindles as they move by the trash opening. Even more specifically, it is desirable to have a slight arcuate shape to the horizontal bars that conforms generally to the portion of the spindle orbit adjacent the trash opening.

A further object of the invention is to provide with the above type of grille structure a means for holding the grille structure in an inner position as described above and, if desired, in an outer position in which the trash opening is left substantially open.

Other objects and advantages of the present invention will become apparent to those skilled in the art as the nature of the invention is better understood from the following description and as shown in the accompanying drawings.

Figure 1:
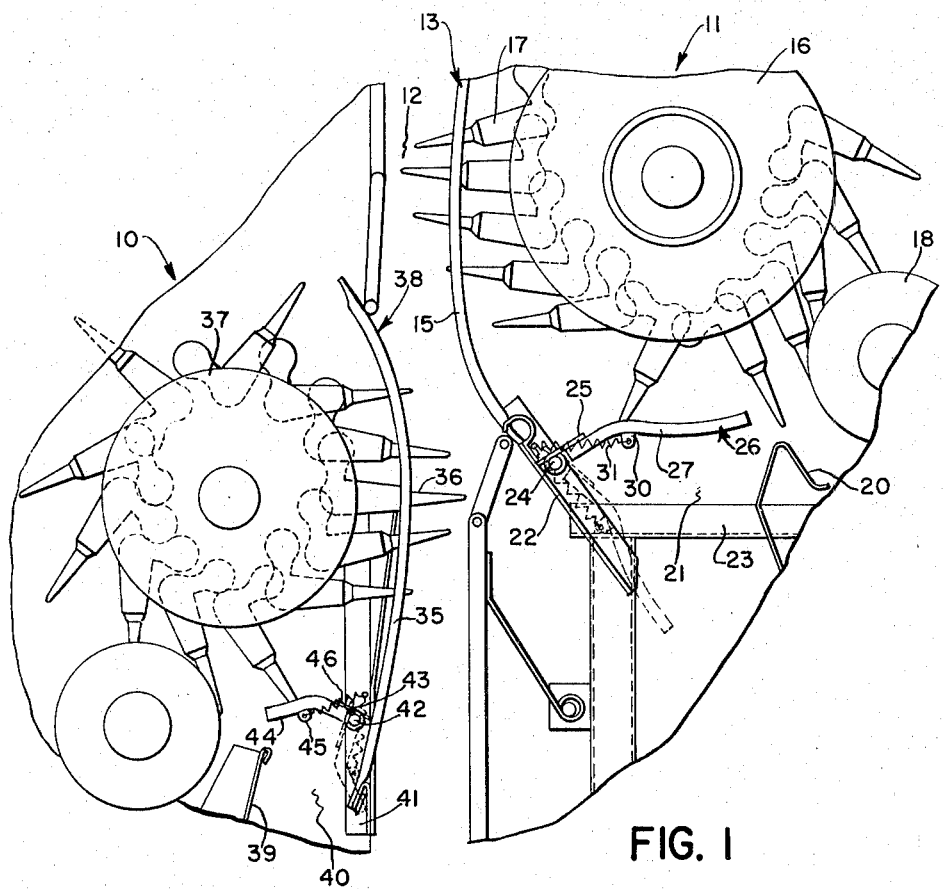
FIG. 1 is a sectional view taken in a horizontal plane through a portion of a conventional type cotton harvester.

The harvester, herein to be described only partially, is of the type shown in the aforementioned Hubbard Patent 2,904,948. Therefore, if details of the harvester are desired, such may be had by referring to that patent. The harvester is composed of a pair of harvesting units 10, 11 positioned on the left and right sides of a plant passage 12. The right picking unit 11 is composed of a housing structure, indicated in its entirety by the reference numeral 13 that includes front and outer walls, not shown, that close the front and outer side of the housing 13. As is conventional, the housing 13 has an inner side wall composed of a series of fore-and-aft extending horizontal bars 15 that lie alongside and define one side of the plant passage 12. Contained within the housing structure 13 is an upright harvesting mechanism or drum 16 that includes a plurality of vertically spaced horizontal rows of picking spindles 17. The rows of spindles are spaced apart so as to permit the spindles 17 to extend between the bars 15 and into the plant passage 12. Upon rotation of the drum 16, the spindles 17 will move in an orbit a part of which extends into the passage 12 for harvesting the cotton from the plants and part of which includes a sweep across the rear portion of the housing 13 to a doffing mechanism 18 that removes the harvested cotton from the spindles 17.

Figure 2:
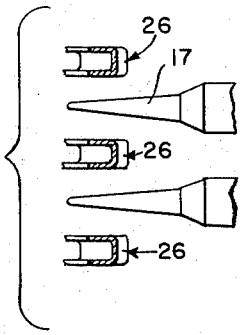
FIG. 2 is an enlarged sectional view taken substantially along the line 2—2 of FIG. 1.

The housing structure 13 has rear wall structure that includes an upright baffle 20 that is spaced outwardly from the rear ends of the grid bars 15. The baffle 20 therefore defines with the rear upright edge of the grid bars 15 a trash discharge opening 21 adjacent the rear side of the doffing drum 16. The cotton that is harvested from the plants in the passage 12 is drawn inwardly of the housing 13 by the spindles 17 and the trash accumulated in the harvesting operation will impinge against the baffle 20 and be directed outwardly through the opening 21. A pair of horizontal structural members 22, 23 are provided in the housing structure 13 and are disposed relatively closely adjacent to the ground. Supported on the structural member 23 is an upright pivot rod 24 that has pivotally supported thereon a hinge plate 25. Carried on the hinge plate 25 by welding or other suitable means are horizontal bars or members 26 that are vertically spaced apart and are horizontally aligned with the spacing between the picker spindles 17. The bars or members 26 extend from the hinge plate 25 to outer free ends that terminate relatively close to the tip of the baffle member 20. The outermost portions 27 of the members 26 are arcuate shaped and conform generally to the sector of orbit that the outer tips of the spindles pass as they move adjacent the opening 21. As may best be seen in FIG. 2, the members 26 are positioned to hold the cotton on the spindles 17 permitting the trash to pass outwardly between the bars 26 and through the opening 21. It is significant that the members or bars 26 are disposed adjacent the tips of the spindles 17 so as to prevent cotton that is loosely held on the spindles to be retained in the area of the spindles until the cotton approaches the area of the doffer 18.

The lowermost member 26 has a lug 30 extending rearwardly therefrom. A spring 31 extends from the lug 30 to a forward part of the structural member 22. The spring 31 is positioned to pass through the hinge pivot on the axis of the rod 24 as the members 26 pass from an innermost position as shown in FIG. 1 in full representation and an outer inoperative position as shown in dotted representation in FIG. 1. Consequently the spring 31 moves through an over-center position at both the innermost and outermost positions so that the entire grille structure as defined by the members 26 and hinge 25 is capable of being positioned in either position. A suitable stop, not shown, is provided on the structural member 22 to engage portions of the hinge plate 25 so as to limit movement of the grille structure to the innermost position. The lower member 26 of the grille structure will contact the vertical flange of the frame member 22 in its outermost position and consequently the flange operates as a stop in the outermost position.

The left harvesting unit 10 is provided with an inner wall structure composed of vertically spaced grid bars 35 lying alongside the passage 12. The bars 35 are spaced apart to permit passage of spindles 36 into the passage. The spindles 36 are supported on an upright harvesting drum 37 that rotates to drive the spindles through the passage 12 and from thence rearwardly and outwardly adjacent a rear side of the housing, as indicated in its entirety by the reference numeral 38, for the harvesting unit 10. The rear side of the housing unit 38 is composed in part of an upright baffle 39 that is spaced outwardly from the rear ends of the grid bars 35 to define an opening 40 through which trash may move outwardly of the housing 38.

A frame structural member 41 is provided on the underside of the housing 38 and supports an upright hinge rod 42 thereon. Carried on the hinge rod 42 is a hinge plate 43 that has welded to a face thereof a plurality of vertically spaced horizontal bars or members 44. The members 44 and the hinge plate 43 define an upright grille structure just forwardly of the opening 40 that operates to block passage of cotton material through the opening 40. The lowermost bar 44 is provided with a rearwardly projecting lug 45 that receives an end of a spring 46. The opposite end of the spring 46 is connected to the frame member 41. The grille structure may move from an innermost position as shown in full representation in FIG. 1 to a rearmost position as shown in dotted representation in FIG. 1. In the latter position the grille structure is placed in an unblocking relation to the opening 40. The spring 46 will move between over-center positions in regard to the axis of the rod 42 as the grille structure is moved from the innermost to the outermost position. A stop member, not shown, is provided on the frame member 41 to limit movement of the grille structure to its innermost position. In the outermost position, the lower bar 44 will contact the vertical flange of the frame member 41 and be held in that position.

In operation, an operator may if he desires move the grille structure into the position shown in full representation in FIG. 1. In such a position cotton bolls will be held on the respective spindles 17, 36 until the cotton moves into the area of the respective doffers. However, the grille structure will retain a certain amount of large trash and consequently if not needed to retain the cotton, it will be desirable to move the grille structure to the outermost position as shown in dotted representation in FIG. 1. In most fields, the cotton will be held on the spindles 17 and 36 and very little cotton will tend to pass through the respective openings 21, 40. In these fields it will be desirable to move the grille structure to the outermost position to permit the maximum amount of trash to pass through the openings 21, 40. Also in operation, if the picking spindles become clogged with cotton and/or other foreign matter, or should a large foreign object be encountered by the respective drums 16, 37 and moved into the housing, the force of the springs 31, 46 may be overcome and the entire grille structure may be automatically moved to the outermost positttion so as to permit the large foreign object or the accumulation of cotton to move outwardly through the trash openings 21, 40. Consequently by having the grille structure spring loaded to its innermost position, there is provided a safety feature to prevent damage to the harvesting mechanisms within the respective housing 13, 38.

While only one form of the invention has been shown, it should be recognized that other forms and variations will occur to those skilled in the art. Therefore while the preferred form was shown and described in concise and detailed manner for the purpose of clearly illustrating the principles of the invention, it should be understood that there is no intention to limit or narrow the invention beyond the broad concept set forth in the appended claims.

What is claimed is:

1. In a cotton harvester adapted for forward movement over a field of row planted cotton plants and having an upright rotatable harvesting mechanism with vertically spaced horizontal rows of laterally extending picking spindles, and a housing encasing the mechanism with a side adjacent the mechanism adapted to pass alongside a row of plants and being open to permit movement of the spindles into the plants for harvesting cotton therefrom, the housing further having a trash opening rearwardly of the mechanism for permitting trash accumulated by the spindles in harvesting the cotton to move outwardly of the housing, the improvement residing in an upright grille structure supported on the housing structure in a material blocking relation in respect to the opening and composed of vertically spaced apart horizontal members disposed in substantial horizontal alignment with the spacings between the rows of spindles and adjacent the outer ends of the spindles as the spindles move adjacent the opening.

2. The invention defined in claim 1 further characterized by the horizontal members being in vertical alignment with the outer ends of the spindles whereby the trash will be permitted to pass between the members and the cotton harvested by the spindles will be restricted from movement outwardly of the spindles.

3. The invention defined in claim 1 whereby the spindles move in a continuous orbit, part of which is adjacent the opening and the grille members are arcuate shaped at least in part to conform to the path of orbitry of the outer ends of the spindles as they move adjacent the opening.

4. The invention defined in claim 1 in which the grille structure includes a vertical support member with the horizontal members projecting in cantilever fashion therefrom in the direction of movement of the adjacent spindles to free ends whereby cotton impinging against the horizontal members will move freely off of the free ends.

5. The invention defined in claim 4 further characterized by the vertical support member being pivotally mounted on the housing to permit movement of the horizontal members toward or away from the spindles.

6. The invention defined in claim 1 further characterized by the grille structure being supported on the housing by means permitting adjustment thereof toward or away from the spindles.

7. The invention defined in claim 6 further characterized by biasing means between the housing and grille structure for urging the grille structure toward the spindles, but permitting the grille structure to yield away from the spindles.

8. The invention defined in claim 5 further characterized by a coil spring extending between the grille structure and housing and adapted to pass through the axis of the vertical pivot of the support member.

9. The invention defined in claim 8 further characterized by stops on the housing structure limiting movement of the grille structure between an innermost position in which the horizontal members are vertically aligned with the outer portions of the spindles and an outermost position in which the opening is substantially unblocked by the horizontal members.

10. In a cotton harvester including an upright casing with an upright trash discharge opening, an upright rotatable harvesting drum having vertically spaced and horizontal rows of picking spindles operating adjacent said opening, the invention comprising: a grille structure supported on said casing composed of a plurality of vertically spaced horizontal members horizontally aligned with the spacings between the rows of spindles and closely adjacent the tips of the spindles and in blocking relation to said discharge opening whereby cotton on the spindles will be restricted from passing through the grille structure while trash may pass between the members.

References Cited

UNITED STATES PATENTS

| | | | |
|---|---|---|---|
| 2,904,948 | 9/1959 | Hubbard | 56—41 |
| 2,930,177 | 3/1960 | Hubbard | 56—41 |
| 3,046,721 | 7/1962 | Kowalik et al. | 56—41 |
| 3,114,997 | 12/1963 | Folsom | 56—44 |
| 3,170,277 | 2/1965 | Hubbard | 56—44 |

RUSSELL R. KINSEY, *Primary Examiner.*